US008773508B2

(12) United States Patent
Daniel et al.

(10) Patent No.: US 8,773,508 B2
(45) Date of Patent: Jul. 8, 2014

(54) 3D IMAGING SYSTEM

(75) Inventors: Ronald Daniel, Oxfordshire (GB);
James Paterson, Oxfordshire (GB);
David H. Auty, Surrey (GB)

(73) Assignee: Fuel 3D Technologies Limited,
Oxfordshire (GB)

(*) Notice: Subject to any disclaimer, the term of this patent is extended or adjusted under 35 U.S.C. 154(b) by 757 days.

(21) Appl. No.: 12/935,046

(22) PCT Filed: Mar. 27, 2009

(86) PCT No.: PCT/GB2009/050299
§ 371 (c)(1),
(2), (4) Date: Dec. 13, 2010

(87) PCT Pub. No.: WO2009/122200
PCT Pub. Date: Oct. 8, 2009

(65) Prior Publication Data
US 2011/0102550 A1 May 5, 2011

(30) Foreign Application Priority Data
Apr. 2, 2008 (GB) .................................. 0805971.9

(51) Int. Cl.
*H04N 13/02* (2006.01)
(52) U.S. Cl.
USPC .............. 348/46; 348/42; 348/43; 348/44; 348/45; 348/47; 348/48; 348/49; 348/50; 348/51; 348/52; 348/53; 348/54; 348/55; 348/56; 348/57; 348/58; 348/59; 348/60
(58) Field of Classification Search
USPC .............. 345/420, 589; 348/231.99; 382/154; 210/103
See application file for complete search history.

(56) References Cited

U.S. PATENT DOCUMENTS 6,686,921 B1* 2/2004 Rushmeier et al. ........... 345/589
2003/0025788 A1 2/2003 Beardsley
(Continued)

FOREIGN PATENT DOCUMENTS

CN 101013505 A 8/2007
EP 1 335 322 A2 8/2003
(Continued)

OTHER PUBLICATIONS

Mostafa G.-H Mostafa, et al., "Integrating Stereo and Shape from Shading," Image Processing, 1999. ICIP 99. Proceedings. 1999 International Conference on , vol. 3, No., pp. 130,134 vol. 3, 1999 doi: 10.1109/ICIP.1999.817085.*

(Continued)

*Primary Examiner* — Dave Czekaj
*Assistant Examiner* — Shanika Brumfield
(74) *Attorney, Agent, or Firm* — Renner, Otto, Boisselle & Sklar, LLP

(57) ABSTRACT

An apparatus and method for computing a three dimensional model of a surface of an object are disclosed. At least one directional energy source (106-109) directionally illuminates the object (101). An imaging assembly (104), having at least two spatially separated viewpoints (111,112) at fixed positions relative to each other, records a series of images of the object at each viewpoint when the object is illuminated by the source. At least one localisation template (102,103) having predetermined geometrical features is visible to at least one of the viewpoints simultaneously with the object. The images recorded at the viewpoints are analysed so as to determine the location and pose of each viewpoint relative to the template for each image in the series of images. Photometric data for the object is generated using the calculated location and pose of the viewpoints and the image data. Geometric data comprising an initial three dimensional model of the object is generated by performing stereoscopic reconstruction using optical triangulation. The geometric data and photometric data are then combined to construct the three dimensional model.

28 Claims, 5 Drawing Sheets

(56) References Cited

U.S. PATENT DOCUMENTS

| | | | |
|---|---|---|---|
| 2003/0038801 A1* | 2/2003 | Terauchi et al. | 345/420 |
| 2004/0217260 A1 | 11/2004 | Bernardini et al. | |
| 2005/0180623 A1 | 8/2005 | Mueller et al. | |
| 2006/0176520 A1 | 8/2006 | Motomura et al. | |
| 2006/0187319 A1* | 8/2006 | Teramoto et al. | 348/231.99 |
| 2009/0101552 A1* | 4/2009 | Fulkerson et al. | 210/103 |
| 2009/0297020 A1* | 12/2009 | Beardsley et al. | 382/154 |

FOREIGN PATENT DOCUMENTS

| | | | |
|---|---|---|---|
| EP | 1 770 356 A2 | 4/2007 | |
| EP | 1770356 A2 * | 4/2007 | G01B 11/25 |
| GB | 2 370 738 A | 7/2002 | |
| JP | 2005-503867 A | 2/2005 | |
| JP | 2007-101276 A | 4/2007 | |
| JP | 3967367 B2 | 8/2007 | |
| WO | 01/39124 A2 | 5/2001 | |
| WO | 2007/129047 A1 | 11/2007 | |
| WO | WO 2007129047 A1 * | 11/2007 | G01B 11/25 |
| WO | 2008/000055 A1 | 1/2008 | |
| WO | 2008/012479 A1 | 1/2008 | |

OTHER PUBLICATIONS

British Search Report for corresponding British Application No. GB0805971.9 dated May 18, 2009 (claims 12 and 31).

British Search Report for corresponding British Application No. GB0805971.9 dated May 18, 2009 (claims 20 and 35).

Examination Report for corresponding New Zealand Application No. 588740 dated Mar. 9, 2012.

International Search Report and Written Opinion for corresponding International Application No. PCT/GB2009/050299 mailed Jul. 17, 2009.

UK Search Report for corresponding UK Application No. GB0805971.9 dated Jul. 22, 2008.

Mostafa et al., "Integrating Stereo and Shape from Shading", Image Processing, 1999. ICIP 99 Proceedings International Conference on Kobe, Japan, Oct. 24-28, 1999, Piscataway, NJ USA, IEEE, US vol. 3, Oct. 24, 1999, pp. 130-134, XP010368853.

D'Angelo et al., "Image-based 3D Surface Reconstruction by Combination of Photometric, Geometric, and Real-Aperture Methods", ISPRS Journal of Photogrammetry and Remote Sensing, vol. 63, No. 3, Nov. 26, 2007, pp. 297-321, XP022639947.

Sung Joon Ahn et al., "Circular Coded Landmark for Optical 3D-Measurement and Robot Vision", Intelligent Robots and Systems, 1999, IROS '99 Proceedings, 1999 IEEE/RSJ International Conference on Kyongju, South Korea Oct. 17, 1999, Piscataway, NJ, USA, IEEE, US, vol. 2, Oct. 17, 1999, pp. 1128-1133, XP010362465.

Sato et al., "Illumination Distribution from Shadows", Institute of Industrial Science, The University of Tokyo, vol. 1, Jun. 23, 1999, pp. 306-312, XP010347656.

L.B. Wolff, "Using Polarization to Separate Reflection Components", Computer Vision and Pattern Recognition, 1989 Proceedings CVPR '89, IEEE Computer Society Conference, San Diego, CA, USA, Jun. 4-8, 1989, Washington, DC, USA, pp. 363-369, XP010016473.

Davis et al., Spacetime Stereo: A Unifying Framework for Depth from Triangulation, Proceedings 2003 IEEE Computer Society Conference on Computer Vision and Pattern Recognition, Jun. 18-20, 2003, Madison Wisconsin, vol. 2, pp. 359-366, XP010644694.

Zhou et al., "Estimation of the Size and Location of Multiple Area Light Sources", Pattern Recognition, 2004, ICPR Proceedings of the 17th International Conference on Cambridge, UK Aug. 23-26, 2004, Piscataway, NJ, USA, IEEE, vol. 3, pp. 214-217, XP010724638.

Japanese Office Action for corresponding Japanese Application No. 2011-502433 issued on Jun. 18, 2013 and English translation.

* cited by examiner

3D IMAGING SYSTEM

The present invention relates to an apparatus and method for obtaining three dimensional (3D) images. In particular, the invention relates to 3D imaging and measurement of the surfaces of objects.

3D imaging is the acquisition into digital form of geometry (physical shape) of a surface region of a real object. In some cases, the material reflectivity properties of the object may also be acquired. A surface region of an object can be considered to be a sub-region of the physical surface of an object. The system can be extended to include imaging of extensive surface regions, meaning that the system is able to acquire a region larger than that obtainable by the imaging device from a single viewing position (for example the surface region on more than one side of a 3D object). The system may capture part, or all, of the surface shape and material characteristics of an object or scene as well as the shape's metric properties. Examples of material reflectivity properties include diffuse surface colour, and a measure of the quantity of specular reflection exhibited by the material, both as an absolute value and by spectral component.

Applications for 3D imaging can be found in a wide variety of areas, such as imaging of the human body for medical purposes, capturing data for rendering in production of video games and film, architectural model capture, reverse engineering for computer aided design (CAD), and data capture for archival purposes, such as archaeology. Various systems are known for the 3D acquisition of the shape of an object, but typical existing systems exhibit one or more of the following limitations in this regard:

They acquire only geometry, and not material reflectance.
They are not portable, and thus do not allow 'in-situ' capture.
They do not achieve a resolution (samples per unit area) adequate for convincing rendering or detailed analysis.
They do not capture a large enough area of the subject (which may be, for example, an entire wall or floor, or a self-occluding object which cannot be acquired from a single viewing position, such as a human body part).
They do not provide an adequate means to 'stitch', which is to combine multiple small sections of captured data into a single continuous larger section, in an automated manner.
The system employs complex and/or prohibitively expensive hardware such as automated robotic arms, precision manufactured parts, etc.
The system requires complex and time-consuming calibration.
Calibration of the imaging device and any other system geometry must be carried out as separate procedures, resulting in system calibration error stacking.
The key physical parameters of the system are not referred to a metric standard.
The resulting measurements are not traceable to a metrological standard.
The system requires 'active' stereoscopic techniques based on, e.g. projected laser stripes, which renders the system unsuitable for e.g. medical use due to issues with system safety or acceptability.

The present system aims to alleviate, at least partially, the issues above.

In accordance with one aspect of the present invention there is provided an apparatus for computing a three dimensional model of an object. The apparatus comprises at least one directional energy source arranged to directionally illuminate the object. An imaging assembly, having at least two spatially separated viewpoints at fixed positions relative to each other, is arranged to record a series of images of the object at each viewpoint when the object is illuminated by the source. At least one localisation template having predetermined geometrical features is visible to at least one of the viewpoints simultaneously with the object. A processor is arranged to analyse the images recorded at the viewpoints, so as to determine the location and pose of each viewpoint relative to the template, for each image in the series of images, and generate photometric data for the object using the calculated location and pose of the viewpoints, together with the image data and the direction of illumination from the energy source. The processor is further arranged to generate geometric data comprising an initial three dimensional model of the object by performing stereoscopic reconstruction using optical triangulation, and combine the geometric data and photometric data to construct the three dimensional model.

Thus the apparatus is capable of providing at least two separated viewpoints of the object. In the case of two viewpoints this is often referred to as a 'stereo pair', although it will be appreciated that more than two viewpoints may also be used, and this may increase the precision and/or visible range of the apparatus. The words "stereo" and "stereoscopic" as used herein are intended to encompass the processing of images from two, or three or more, viewpoints, and not intended to restrict the disclosure to paired viewpoints only.

The directional energy source or sources may be, for example, a standard photographic flash, a high brightness LED cluster, or Xenon flash bulb or a 'ring flash', although it will be appreciated that the energy need not be in the visible light spectrum. The source may comprise any method of generating directional energy, such as electromagnetic radiation, which will hereinafter be referred to as 'light', it being understood that this is not restricted to radiation in the visible spectrum. Appropriate optical filtering, such as polarising filters, for example, may preferably be included with the source(s) and/or image sensing assembly to reduce visibility of direct reflections of the directional source(s) at the viewpoints. Where visible-light directional energy is applied, then sensors may be provided at the viewpoints including, for example, two or more standard digital cameras, or video cameras, or CMOS sensors and lenses appropriately mounted. In the case of other types of directional energy, sensors appropriate for the directional energy used are adopted. A discrete sensor may be placed at each viewpoint, or in another alternative a single sensor may be located behind a split lens.

In one embodiment the direction of illumination may be known relative to the viewpoints. This can be achieved, for example, if the illumination is provided by multiple energy sources, fixed relative to the viewpoints.

If the direction of illumination is not known relative to the viewpoints, then the localisation template(s) must be illuminated by the source, as well as being visible to at least one of the viewpoints, in each image of the series of images. For example, the source may be moved between images in the series of images, in which case the localisation template may be used to identify the direction of illumination.

The template or templates preferably comprise a predetermined set of geometric features (for example a printed pattern) such that the relative position of the imaging device and the template can be determined by imaging the template. Features of the pattern can be designed to act as highly exciting beacons for image processing algorithms. A light source localisation feature of known dimensions may also be provided for facilitating the computation of the relative position of the source(s) with respect to the templates. This may be, for example, a cone or pyramid of known dimensions. The template may also include a colour calibration portion for facilitating colour response calibration and/or correction in the imaging device.

Each template may also optionally incorporate one or more unique features allowing an individual template to be uniquely identified in an automated manner; one example of this is a printed 1D or 2D tar-code'. Another example of this is inclusion of a Radio Frequency Identification Device, or 'RFID tag'. Another example might be inclusion of one or more retro-reflective markers arranged in a pattern. A further example is the inclusion of an embedded EEPROM chip or similar in the template. Any of these features may be used as a "key" linking the recorded images to the object and/or ensuring a single use of the template. The template may incorporate additional markers that enable automatic recognition and/or measurement against a metric standard. Optionally a short-range RFID tag transceiver allows communication between templates incorporating the RFID tag and the rest of the apparatus. Optionally interface hardware in the apparatus allows communication between templates incorporating EEPROM chips or similar and the rest of the apparatus.

The unique identification features may be also be included on templates to be used with other 3D image acquisition systems. Therefore in accordance with another aspect of the present invention there is provided an apparatus for computing a three dimensional model of an object, comprising at least one image scanner arranged to generate at least one 3D model of the object. The apparatus also includes at least one localisation template having predetermined geometrical features and a unique identification feature enabling the template to be distinguished from other templates. The localisation template is arranged when in use to be detectable by the scanner simultaneously with the object. A processor is arranged to analyse the image or images recorded by the sensor, so as to construct the three dimensional model. The invention also provides a localisation template having such a unique identification feature.

In a preferred embodiment, the apparatus includes a plurality of localisation templates. The sensors and source may be locatable in a first location in which at least two first templates are visible to the sensors simultaneously with a first portion of the object, and movable to a second location in which at least one of the at least two first templates is still visible to the sensors simultaneously with at least one other template and a second portion of the object overlapping with the first portion. The sensors record images from both locations, and the data from the images is combined so as to generate a model covering the first and second portions of the object.

In other words, the use of multiple templates enables images of overlapping portions of a large object to be used to build up an image of a larger portion of the object than would otherwise be possible. Furthermore, multiple templates may also be used with other methods of obtaining geometric data (e.g. a laser striper) and their use is not restricted to the arrangement using passive stereo. Thus in accordance with a further aspect of the present invention, there is provided apparatus for constructing a three dimensional model of an object, comprising at least one image sensor arranged to record images of the object. The apparatus also comprises a plurality of localisation templates, each comprising a predetermined set of geometric features visible to the sensor simultaneously with the surface so as to enable the determination of the relative position of the sensor with respect to the template. A processor is arranged to analyse the images recorded by the sensor so as to determine the relative position of the sensor with respect to each template and combine images from multiple viewpoints of the object for further processing. Surface reconstruction of a surface of the object may be performed using a measured variation in reflected energy from a directional source or by processing the images using any other method known in the art.

The processor preferably includes means to store images from the imaging device and carry out certain image processing functions, 3D reconstruction and representation of the surface or object under inspection, and other functions such as: reconstruction of any separate illumination conditions, extraction of a metric standard, extraction of a colour standard, extraction and recording of a unique identifier, and enforcing single use for a template. Typically this might be a desktop or laptop PC with monitor, hard disk, and all other common components.

The system adopts metrological principles, so that, at least in preferred embodiments: measurements are made with respect to standard 'templates' that are, in principle, traceable to superior metrological standards; all imaging is carried out using a fixed coordinate datum or set of coordinate data; all calibration of the system can, in principle, be carried out using 'templates' as reference objects. A particular characteristic of one embodiment of the system is the ability to effectively handle large surface areas that cannot be accommodated in a single camera view of the scene. The combination of passive stereoscopic geometric data and photometric data removes the need for patterned light such as laser stripe projection.

The system is preferably suitable for portable capture, i.e. it may be movable to an object or extensive surface so that it can be captured 'in situ'. The sensor(s) and source(s) are therefore preferably incorporated in a portable, hand-held instrument. In use, a series of images of the surface are preferably captured with one or more templates placed on or around the surface such that they may be imaged simultaneously with the surface. A set of stereo images are acquired by moving the directional source and firing the directional source synchronized with stereo (two or more viewpoint) image capture. If the directional source is light, then such images are called stereo photometric images. Processing is then carried out (potentially 'off-line' after capture) to reconstruct the surface under inspection. A photometric reconstruction of the surface area being acquired may be performed by processing a set of images having varying directional lighting from one 'side' of the two stereo viewpoints. A passive stereoscopic reconstruction of the surface area being acquired may be performed by processing one or more stereo pairs of images.

In accordance with a further aspect of the present invention there is provided a method for computing a three dimensional model of an object. The object is directionally illuminated with at least one directional energy source. A series of images of the object is recorded at each of at least two spatially separated viewpoints at fixed positions relative to each other. The images from at least one of the viewpoints also include at least one localisation template having predetermined geometric features. The location and pose of each viewpoint relative to the template is determined from the recorded images. Photometric data for the object is generated from the recorded images using the calculated location and pose of the viewpoints together with the direction of illumination. Geometric data comprising an initial three dimensional model of the object is generated by performing stereoscopic reconstruction using optical triangulation. The geometric data and photometric data are combined to construct the three dimensional model.

In accordance with a yet further aspect of the present invention there is provided a method for constructing a three dimensional model of an object. An image sensor is used to record images of overlapping portions of the object from multiple viewpoints, each image including at least two localisation templates having predetermined geometrical features. The relative position of the sensor with respect to the templates is determined. Images from the multiple viewpoints of the surface are combined for further processing. Surface reconstruction of a surface of the object is performed, preferably using a measured variation in reflected energy from a directional source.

In accordance with another aspect of the present invention there is provided a method for computing a three dimensional model of an object. At least one image sensor is used to record an image of the object, together with at least one localisation template having predetermined geometrical features and a unique identification feature enabling the template to be distinguished from other templates. The image or images recorded by the sensor are analysed so as to construct the three dimensional model.

Some preferred embodiments of the invention will now be described by way of example only and with reference to the accompanying drawings, in which.

Figure 1:
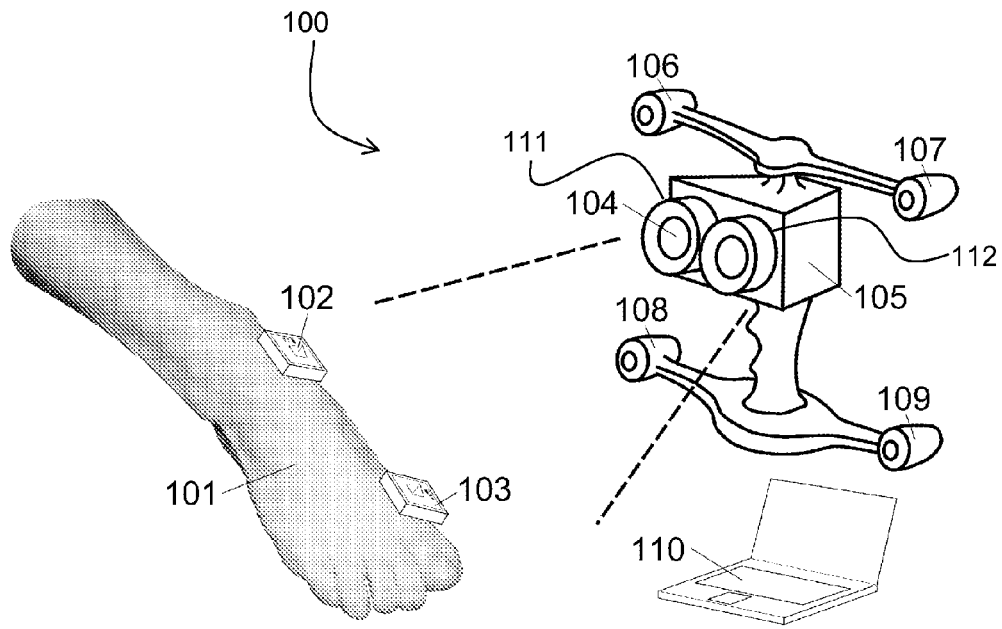
FIG. 1 shows an apparatus for obtaining a 3D image of an object.

FIG. 1 shows apparatus 100 for capturing a 3D image of an object 101. The apparatus 100 includes an imaging device 104 comprising two cameras 111, 112 and four directional light sources 106-109 rigidly affixed to the cameras 111, 112. As shown in this example, the device 104 is being used to capture part of the surface of a human limb, although it will be appreciated that its application is not limited to the human body, and the device could be used for any object having largely similar characteristics, or sections of larger objects, or surfaces from environments such as walls and floors. One or more localisation templates 102, 103 are placed on or near the object 101 so as to be viewable by the imaging device 104 simultaneously with the surface of the object 101. Such templates 102, 103 are required to be in the viewing field of the cameras 111, 112 for reconstruction to be performed. Although only a single template 102, 103 is required to reconstruct the image, the surface area of the object 101 that can be acquired when only a single template is used is limited. Increasing the number of templates allows the system to cover as large an area as required. Any suitable method of affixing the templates may be used, such as, for example, attachment using a 'use once' sticky pad, or double-sided tape.

In this example it is assumed that the viewing device 104 is hand-held, and includes associated casing and handles 105, although it will be noted that this physical configuration is not prescriptive and the device could have any suitable shape and could be supported, for example by a tripod, rather than hand-held. Because the light sources are rigidly affixed relative to the cameras, the positions of the light sources relative to the camera are known. An optional feature of the system is a radio transceiver contained within the casing 105 for communicating with and uniquely identifying RFID tags embedded in the associated localisation templates 102, 103. A further optional feature of the system is interface hardware for communication with and uniquely identifying embedded EEPROM or similar devices in the associated localisation templates.

The directional light sources 106-109 are operated simultaneously with both cameras 111, 112, so that each camera obtains a series of 2D images of the object 101 and template(s) 102, 103. The 2D images from the cameras are then processed by a processing means to generate a 3D representation of the object 101, as discussed in more detail below. The processing means is depicted in this example as a laptop computer 110, although it will be appreciated that processing might also be carried out via an 'on-board' processor. It will be noted that that processing may be carried out either 'on-line' (i.e. during or immediately after image capture), or 'off-line', in which case a series of images are saved, for example to flash memory, and processed later.

Figure 2:
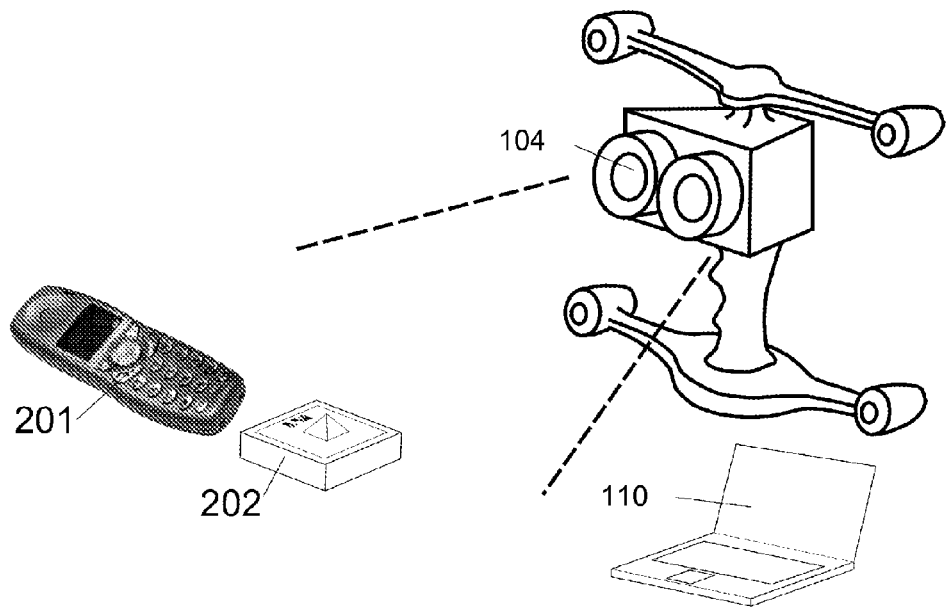
FIG. 2 shows the apparatus of FIG. 1 in use capturing a section of a mobile telephone.

As previously, discussed, the imaging system is not restricted to imaging of the human body. FIG. 2 shows a similar hand-held embodiment of the invention in use to image a region of the surface of an inanimate object, in this case a mobile telephone 201. In this case only a single localisation template 202 need be used, placed near the object, to be viewed simultaneously with the object by the imaging device 104.

Figure 3:
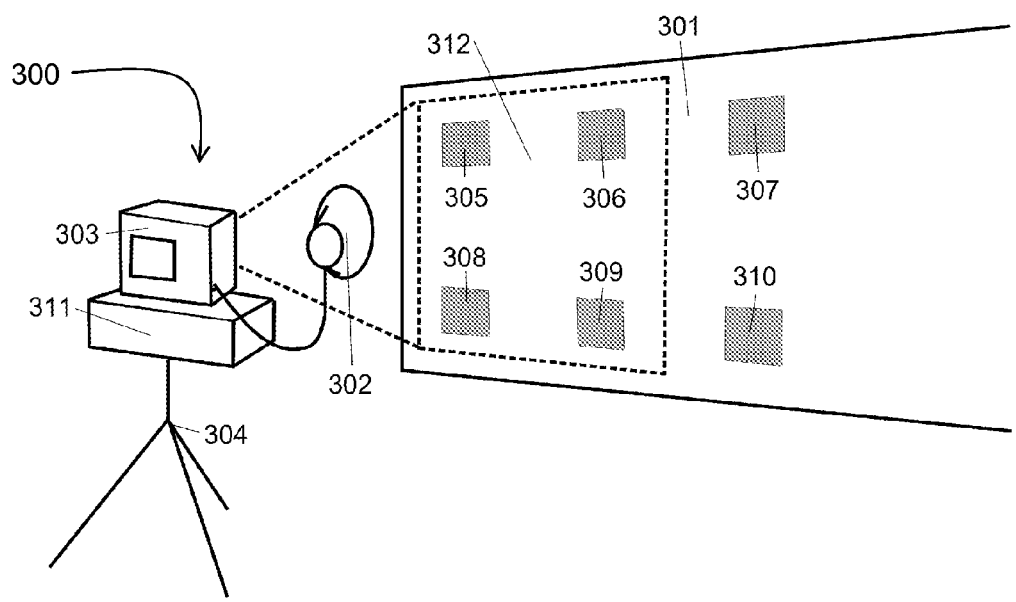
FIG. 3 shows an alternative apparatus in use capturing a section of a wall.
Figure 4:
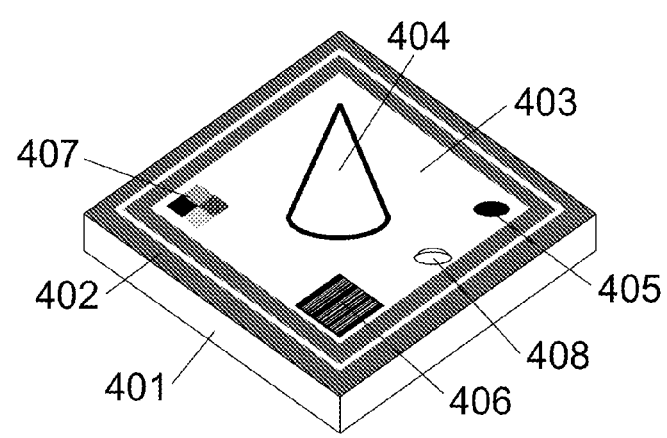
FIG. 4 shows an exemplary localisation template.

An alternative hardware configuration is shown in FIG. 3. In this example, an alternative apparatus 300 is used to capture 3D images of an extended environment such as an area of wall 301. In this example, a single light source 302 (such as a hand-held photographic flash) is movable independently of a camera 303, mounted on a tripod 304. A series of images is captured by the camera 303, with the light source 302 in a different location for each image. An array of templates 305-310 is placed on the wall 301, spaced apart. Each template includes a 'light localisation' feature 404, as shown in FIG. 4 and discussed in more detail below. The light localisation feature 404 on each template is used to resolve the position of the directional light source in each image via image processing on the images of the templates. The image processing may be carried out by a dedicated processing device 311, although it will be appreciated that any suitable processing means may be used.

The series of images taken by the camera 303 are processed in order to acquire 3D information and material surface properties. The sampling resolution of the resulting data is directly related to the resolution of the camera 303. The camera 303 itself can also be moved between images, so as to image the whole wall in sections (discussed in more detail below). It will be appreciated that a similar approach may also be employed by the imaging device 104 of FIGS. 1 and 2 to map the surface of an object 101 in sections. There are several reasons why it may be necessary to image objects such as 101, 201, 301 in sections:

1) The resolution of the imaging device versus the desired reconstruction resolution over the size of the surface is inadequate if the entire area is imaged in one section.

2) The quantity of energy output by the directional light source over the complete area of the surface is inadequate for surface reconstruction from the reflected energy.

3) The region of interest on the surface object cannot be viewed from a single position due to the object self-occluding (e.g. it is not possible to see the entire surface area of a human limb from one viewpoint).

FIGS. 3, 7, 8 and 9 illustrate the principle of obtaining the image of an extended region of the surface the object 101, 301 in sections. It can be seen in FIG. 3 that the viewing area 312 of the camera 303 contains only a subset of the complete wall 301, and four templates 305, 306, 308 and 309 from the full set of six templates 305-310. By obtaining images of multiple sections of wall, a 3D map of the whole surface can be built up. This is further illustrated in FIGS. 8 and 9.

Figure 7:
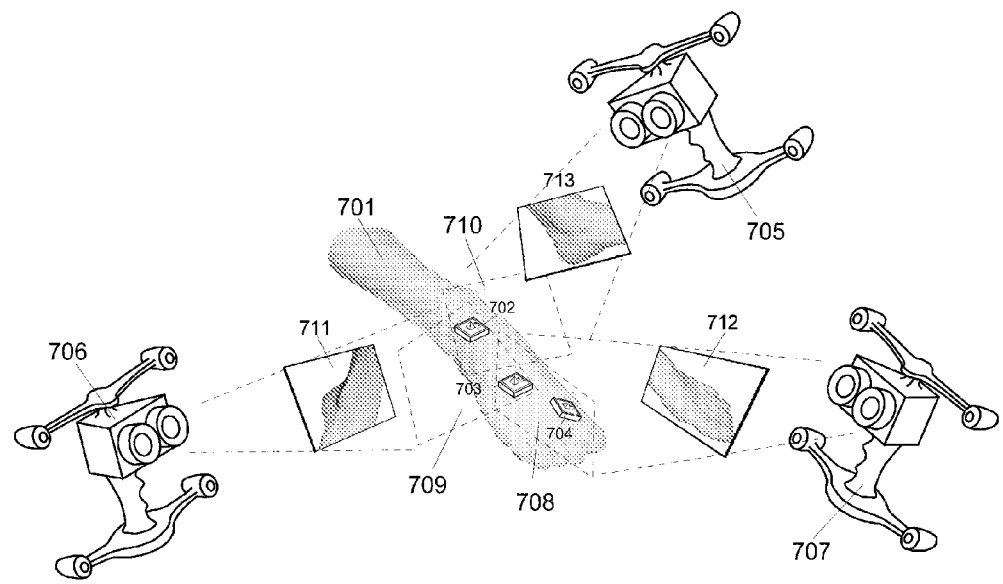
FIG. 7 shows the apparatus of FIG. 1 in use capturing an extensive surface area by imaging in multiple overlapping regions.

Similarly, FIG. 7 illustrates the imaging device 104 of FIG. 1 in three different positions 705, 706, 707, in each of which the cameras 111, 112 have a different field of view 708, 709, 710. Each field of view contains a subset of the total surface area of the object 701 to be imaged, and also contains at least two of the localisation templates 702, 703, 704. The key to automated combination of views into a coherent single model is the use of multiple localisation templates, and this is discussed in more detail below.

Two principle acquisition techniques for acquiring 3D information are discussed herein. The first is photometric reconstruction, in which surface orientation is calculated from the observed variation in reflected energy against the known angle of incidence of the directional source. This provides a relatively high-resolution surface normal map alongside a map of relative surface reflectance (or illumination-free colour), which may be integrated to provide depth, or range, information which specifies the 3D shape of the object surface. Inherent to this method of acquisition is output of good high-frequency detail, but there is also the introduction of low-frequency drift, or curvature, rather than absolute metric geometry because of the nature of the noise present in the imaging process. The second method of acquisition is passive stereoscopic reconstruction, which calculates surface depth based on optical triangulation. This is based around known principles of optical parallax. This technique generally provides good unbiased low-frequency information (the coarse underlying shape of the surface of the object), but is noisy or lacks high frequency detail. Thus the two methods can be seen to be complementary. A system which combines information from both modalities through the use of one or more localisation templates can produce a superior 3D reconstruction in a portable and compact package.

An optional feature of the presently disclosed system is the application of optical filtering to the imaging device and directional sources. The goal is to reduce the visibility of specular reflection of the directional sources in the acquired images, which can lead to artefacts in the images which may confuse the reconstruction software. This may be achieved, for example, by the use of an appropriately orientated set of circular polarizer filters. Optical filtering has particular benefits when used with the imaging processing carried out by the two methods of 3D reconstruction employed by the presently disclosed system.

FIG. 4 shows an exemplary localisation template (suitable for use as the localisation templates 102, 103, 202, 305-310, 702-4 in FIG. 1-3 or 7) in detail. A reader skilled in the art will understand that various template configurations, both 2D and 3D in nature could be used to perform localisation of the imaging device and directional energy sources, and that many of the features described below are optional or replaceable by functional equivalents. In this example the template is a flat planar block 401 with a printed pattern of known metric dimensions and accuracy, consisting of:

1. A thick black border with thin central white line 402;
2. A light localisation feature, in this example shown as a central white area 403 on which a triangular shadow (not shown) is cast by a cone 404 attached to the block when illuminated by a directional light source (such as a photometric light source 302). In an alternative embodiment a matt pyramid may be used inside of a cone. If a pyramid is used, the sides of the pyramid, when illuminated by a directional light source, will be observed by the imaging device as having varying intensity. The necessity for the light localisation feature is determined by the chosen system light source configuration,
3. An orientation marker 405, which removes the 90 degree rotational symmetry from the block, and an optional coding 406, in this example a bar code, which uniquely identifies a particular localisation template. These may potentially be combined into a single feature,
4. An embedded Radio Frequency Identification Device (RFID tag) (not shown), which can further be used to uniquely identify the template through use of a short-range radio transceiver in the casing 105 of the hand-held device.
5. An embedded EEPROM device or similar (not shown), which can further be used to uniquely identify the template through communication with the hand-held device. This might be achieved through introducing it into contact with an appropriate docking area in the casing 105 of the hand-held device (not shown).
6. A colour calibration feature 407 comprising, for example, a region having a coloured pattern designed to facilitate colour response calibration and/or correction in the imaging device.
7. A retro-reflective device 408 which, when illuminated by a source having a similar originating location to the imaging device, provides a highly identifiable feature in the image to act as a "beacon". This may assist detection of the template in the image by the image processing routines The operation of the imaging device 104 shown in FIGS. 1 and 2, using light as the directional energy source and a stereo camera pair as an imaging device, will now be described in terms of the functions performed, namely template localisation (with optional identification), photometric 3D reconstruction, passive stereoscopic 3D reconstruction, and 3D reconstruction via integration of photometric and stereoscopic data. The combination of multiple viewpoints into a single continuous 3D reconstruction is also described.

The first function of the system is to localise the imaging device 104 with respect to the one or more templates visible from each viewpoint from which the object is imaged and, in the case where multiple viewpoints are to be used, the relative position of all of the templates themselves. In the example of FIG. 1, the initial field of view of the stereo cameras 111, 112 includes a section of the surface and two localisation templates 102, 103. Optical camera localisation is the determination of the pose of the stereo camera system in space (specifically camera roll, tilt and yaw angles along with effective camera centre coordinates X,Y,Z in metric units such as millimeters) with respect to an absolute coordinate frame defined on a localisation template. As the localisation templates are of known metric size, the relative position of the stereo cameras can be determined metrically given certain imaging properties of the cameras such as, for example, focal lengths and the projective relationship between the two cameras, as defined, for example, in the Essential Matrix (R, I. Hartley and A. Zisserman *"Multiple View Geometry in Computer Vision"*. Cambridge University Press, ISBN: 0521623049 2000).

Geometric calibration of both an individual camera and a stereo or multi-view camera system is a known technique and can be performed in an image based approach by imaging a calibration template, extracting certain features and using projective geometry to determine parameters specifying the imaging properties of the stereo camera system. An implementation of such a technique is described by J-Y Bouguet *"Camera Calibration Toolbox for Matlab"* http://www.vision.caltech.edu/bouguetj/calib doc/index.html. With knowledge of the camera systems' imaging characteristics, optical camera localisation may then be carried out from a single view (i.e. using a single image from a stereo pair) of a localisation template. This involves performing image processing routines to detect certain features (such as the thin white line 402 in the example template), then applying projective geometry to compute a homography between the coordinate frame of the template to the camera. In the case of stereo views of the template, given a calibrated stereo system additional accuracy of pose estimation can be obtained and/or the calibration parameters verified. Multiple views of the templates can also, in principle, be used to generate key physical parameters needed to describe (or calibrate) the camera, thus potentially allowing the same metric standard to define camera position and the parameters needed for accurate reconstruction.

The system employs one or more localisation templates positioned on or near the surface of the object to be inspected. As previously discussed, in the example of FIG. 1 the viewpoint of the cameras 111, 112 allows them to image templates 102, 103, and where multiple templates are visible then the pose of the stereo cameras 111, 112 can therefore be determined with respect to each of the templates 102, 103 in view. A canonical pose can be (arbitrarily) chosen as that computed from an individual template, or as a transformation of any or all of these coordinate frames. A canonical view is a single coordinate frame into which all views of the current group of templates are projected. In addition, the transformations mapping between the relative coordinate frames of templates 102, 103 can be computed trivially as they are imaged simultaneously from the same viewpoint. The use of multiple templates, and the computation of the relative pose between the templates is key to imaging a large surface in sections.

FIG. 7 illustrates the system of FIG. 1 in use capturing an extensive surface area, again in this example the upper part of a human foot 701. Three localisation templates 702, 703, 704 are affixed to the foot 701, and the foot viewed by positioning the imaging device 104 and associated hardware in three positions 705, 706, 707. Each field of view 708, 709, 710 overlaps with at least one other field of view and contains at least two out of three templates 702, 703, 704. Calibration of the stereo camera system remains constant, and as the relative pose between each template in each view can be computed (i.e. mapping template 702 to 703, 703 to 704 and 702 to 704), a complete mapping determining the relative pose of all templates along with relative pose for the different positions 705, 706, 707 can be determined.

As each template provides independent localisation from a single viewpoint, there is no need to combine position estimates across viewpoints, avoiding accumulated errors in pose estimation arising from image registration (known as 'drift') leaving only the stacked errors associated with the transformation between canonical view coordinates. In principle, a separate image can be taken of the full ensemble of templates to define a single global coordinate system should the error stacking between canonical views be deemed to be unacceptable. This is a significant benefit of the present system over video camera based 'tracking' methods.

To perform this process automatically it is necessary to identify each template in each view of the scene in a consistent fashion. As previously discussed with reference to FIG. 4, each localisation template 401 includes a coding such as a bar code 406 which is used to uniquely identify that localisation template. Every template is thus unique as long as the coding can be reliably detected. This may not be necessary if:

1) localisation templates are placed irregularly and overlapping views contain (at least) two templates in common
2) localisation is sufficiently accurate The relative pose between pairs of localisation templates can then be used to identify them uniquely. Again, depending on the irregularity of placement and the accuracy of pose estimation it may or may not be necessary to use an orientation marker 405 (as shown in FIG. 4) to remove the 90° symmetry from the templates. An alternative to the bar-codification, depending on the relative sensitivity and range of the RFID system employed, would be to use embedded RFID tags to assist unique identification of the templates. A further alternative would be to use an embedded EEPROM chip or similar in the template with appropriate communication hardware to assist unique identification.

The benefits of unique identification of templates are not limited to the case where multiple templates are used to image a large surface in sections. Unique identification can provide additional metadata on images captured by the system to assist in the processing or storage of the resulting image files. One particular example is in the context of medical imaging, in which a codification of the target can be used to assist storing the unique scan with electronic patient records. A unique identifier would also assist clinical trials by providing a data audit trail. If the target is to be placed directly on the patient skin then it must not be reused on another patient because of the possibility of cross-infection. A non-volatile list of template identifier codes could be stored in the imaging device and used to prevent processing on re-used templates, encouraging sanitary practice. In a further example of an industrial process the imaging method presently disclosed could be applied to verify build accuracy of components with the codification of the target providing an end-to-end audit trial for QA management. In a more general example, by allocating specific codes to templates and controlling physical distribution the unique identifier could provide a 'watermark' to determine the originator of a 3D image.

Figure 5:
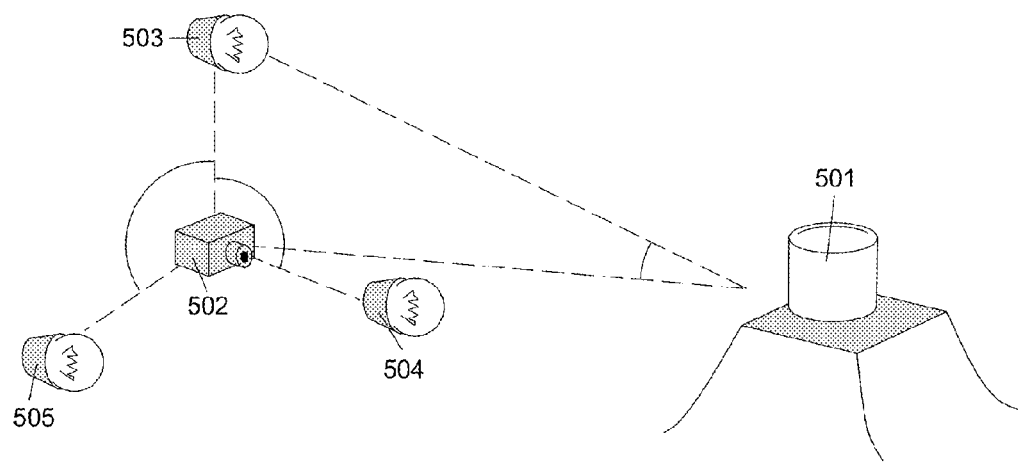
FIG. 5 shows a typical setup for 'traditional' photometric stereo.

The second function of the system is to perform photometric recovery of the surface of the object under inspection. The underlying principle for photometric recovery is that of photometric stereo (PS). In the canonical form of photometric stereo a series of photometric images of the surface are acquired, with the camera remaining static with respect to the object's surface but with geometric variation in lighting direction between images. FIG. 5 illustrates such a system. It is desired to capture geometrical information from the surface of an object 501. To achieve this it is imaged by a single camera viewpoint 502 whilst illuminated individually by a number of identical light sources 503-505; typically a minimum of three light sources will be used.

Photometric stereo requires an approximating model of the surface material reflectivity properties. In the general case this may be modelled (at a single point on the surface) by the Bidirectional Reflectance Distribution Function (BRDF). A simplified model is typically used in order to render the problem tractable. One example is the Lambertian Cosine Law model. In this simple model the intensity of the surface as observed by the camera depends only on the quantity of incoming irradiant energy from the light source and foreshortening effects due to surface geometry on the object. This may be expressed as:

$$I = P\rho L \cdot N \quad \text{(Eqn 1)}$$

Where I represents the camera observed intensity at a single point on the object, P the incoming irradiant light energy at that point, N the object-relative surface normal vector, L the normalized object-relative direction of the incoming lighting and ρ the Lambertian reflectivity of the object at that point.

Typically, variation in P across the surface of the object will be determined in a prior calibration step, and hence can be compensated. L will also typically be determined by calibration. In principle, both calibration steps can be carried out using information obtained by imaging the templates. In the configuration of FIG. 5 the camera and object remain static, and hence the area of the surface observed by the camera at a specific pixel remains the same. Therefore, the intensities observed at a particular camera pixel across a set of images with varying lighting direction may be considered a set of photometric samples. Let the count of lighting directions be M (with M>2), then by stacking multiple (Eqn 1) a solution for N and ρ may be found in a least squares sense via a pseudoinverse:

$$\begin{bmatrix} I^1 \\ I^2 \\ \vdots \\ I^M \end{bmatrix} = \rho \begin{bmatrix} L_X^1 & L_Y^1 & L_Z^1 \\ L_X^2 & L_Y^2 & L_Z^2 \\ \vdots & \vdots & \vdots \\ L_X^M & L_Y^M & L_Z^M \end{bmatrix} \cdot N \quad \text{(Eqn 2)}$$

Here the additional knowledge that N must be normalized allows ρ to be recovered as the norm of N. Thus, given a suitably tractable model of surface reflectance, PS can be used to obtain object geometry as a surface normal map and material properties (for example the possibly inhomogeneous Lambertian reflectivity coefficients ρ). Note that PS is not limited to recovery of just simple Lambertian reflectivity; application of more sophisticated models allows colour reflectivity and a measure of, for example, specular reflection to be recovered. An alternative (or additional) approach is to provide appropriate optical filtering of the imaging device and light source so as to reduce the visibility of specular reflection in the images.

There are several potential issues with the 'traditional' configuration of PS shown in FIG. 5. Firstly, the hardware requirement of multiple physical light sources can in some applications be costly and inconvenient for portable capture. Secondly, in the case where relative light direction is not already known then calibration of the incoming lighting direction and variation in the incoming irradiant light energy is time consuming. The use of the localisation templates previously discussed alleviates these problems.

As an optional feature the localisation templates can provide a manner in which light direction may be determined from a single image. This can be achieved by computing the relative pose of the localisation template, then (in the case of the light localisation feature 404 being a cone) observing the triangular shadow cast by the cone onto the plane 403 of the template. The direction of the incoming light can be found as the ray cast from the apex of the triangular shadow (which lies on the plane of the template) through the tip of the cone 404, which has known dimensions and hence known location with respect to the coordinate frame of the template. In the case of a matt pyramid then, as the surface normal direction of the four sides of the pyramid are known, the relative intensities of the sides may be used in a manner analogous to Eqn 2 to compute a ray towards the light source.

Variation in the incoming light intensity (P) can be estimated by sampling from, in the case of a cone light localisation feature, the non-shadowed parts of the localisation template. In the case of a pyramid light localisation feature a flat area surrounding the pyramid on the localisation template can be used for the same purpose. These regions 403 are uniformly white and flat, therefore any variation in lighting intensity across this region will appear as a change in pixel intensity in the camera image. Samples may be combined from several localisation templates present in the image and, given that a well diffused light source is used, variation in P will be smooth. Assuming that the templates are distributed across the image then the samples collectively can be considered representative of variation in P across the viewable region of the surface. A 2D interpolating function (e.g. a bi-quadratic) may then be fitted to estimate values for P at arbitrary locations in the image.

A further optional function of the localisation templates is to assist calibration and/or correction for variation in colour response in the imaging system, e.g. camera 'white balance'. This may be achieved through processing the images of the templates as the template is of known reflectivity, having e.g. white and black regions. Methods to achieve this will be well known to those skilled in the art. This function might further be facilitated by incorporation of a specific colour calibration feature 407 in the template, which has coloured regions of known reflectance. This would allow a direct comparison between imaged colour response and known base reflectivity.

The third function of the system is to perform passive stereoscopic reconstruction using optical triangulation. Note that this technique does not provide for the acquisition of material reflectance properties per se, and is likely (given the same imaging device is used) to produce lower resolution geometrical data than the photometric approach; the benefit is in the noise characteristics of the recovered data, which are complementary to the photometric reconstruction.

Figure 6:
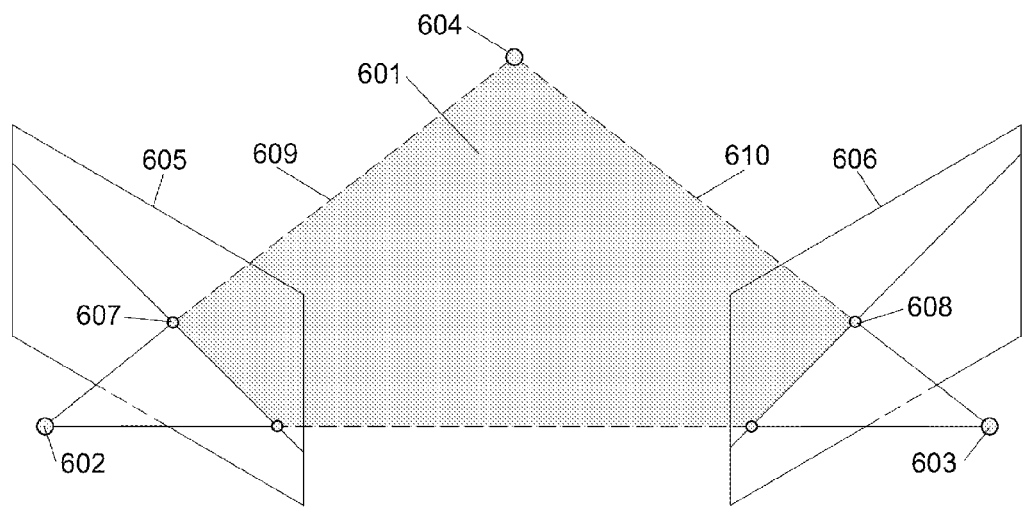
FIG. 6 shows a geometrical illustration of stereoscopic range determination.

For the purposes of this discussion the imaging device is considered to acquire images of the surface of the object from two slightly separated viewpoints, i.e. a stereo image pair. Given the projective relationship between the two stereo viewpoints is known via prior calibration, then depth information can be resolved by correlating 2D points between the images forming the stereo pair. Reconstruction of range information using stereo viewpoints is described, for example, in R, I. Hartley and A. Zisserman *Multiple View Geometry in Computer Vision*, Cambridge University Press, ISBN: 0521623049 2000, and illustrated with reference to FIG. 6. Assuming a standard 'pinhole' model then a plane 601 intersects two points 602, 603 representing the centres of the separated camera viewpoints, two planes 605, 606 representing the camera image planes, and a third point 604 on the surface of the object. The images 607, 608 in the conceptual camera image planes of the object surface point 604 are the intersections of rays 609, 610 from the camera centres to the object surface point 604. Therefore, for a given point 607 the corresponding point 608 must lie upon a line which is the intersection of the plane 601 in the other camera image plane 606. Reconstruction of depth information can therefore be achieved given a calibrated stereo camera pair if a relatively dense set of correspondences between stereo views can be achieved. There are numerous algorithms in this field, for example as described by Kolmogorov and Zabih, *"Multi-*

*Camera Scene Reconstruction via Graph Cuts In Proceedings"*, International Conference on Computer Vision 2003.

One issue with passive stereoscopic reconstruction is that fully shadowed image regions often cannot be recovered as no unique correspondences can be found. A benefit of the system described herein is that multiple stereo image pairs can be acquired, with varying directional lighting. This very much increases the likelihood that the surface will have been properly illuminated in at least one of the image pairs at all visible points, and therefore can be reconstructed without missing data. Geometry reconstructed from different stereo images sets can easily be merged to a single unified dataset as the localisation template provides a frame of reference. A further issue with passive stereoscopic reconstruction is the presence of direct specular reflections from the dominant light source in the images. Specular reflections often result in areas of high image contrast, with the location on the surface varying with viewing direction. Thus they are known to provide a source of "false correspondences", hampering stereoscopic reconstruction. An approach to minimise this issue is to apply appropriate optical filtering to the imaging device and light sources to minimise visible specular reflections.

The fourth function of the system is to reconstruct a 3D model of the surface under inspection, along with associated (spatially varying) material properties. This is done by fusing the data reconstructed from the photometric and geometric recovery methods disclosed above. Photometric stereo provides recovery of a dense surface normal map alongside coefficients of a (inhomogeneous) material reflectance model. For the purposes of this disclosure the underlying model of surface geometry used will be that of the surface of the object visible to the camera being modelled as a 'range map', i.e. a 2D matrix of range samples. In this case, the data produced by the geometric reconstruction can be considered an unbiased but relatively low-resolution sampling of the true 'range map', with a predictable quantity of high frequency noise. The normal map data provided by the photometric reconstruction can be considered a comparatively high-resolution, but biased, sampling of the derivative of the true 'range map'. The reader skilled in the art will appreciate that other representations could be used without departing from the scope of the invention. For example, if the surface of the object being scanned is not representable as a distorted plane (i.e. Range Map), then the Surface Operator, for example, could be used to fit the normal data to obtain detailed measures of curvature, and the surface represented locally as a manifold via, for example, its geodesics or principle curvatures.

Integration of the normal map allows recovery of the surface as a biased range map. Numerous approaches to the solution of the integration problem will be known to those skilled in the art, however one approach is to treat it as a variational problem of the form below; when discretised this becomes a quadratic optimisation problem which is readily solved.

$$\min_z \int \int \left(\frac{n_x}{n_z} - \frac{\partial z}{\partial x}\right)^2 + \left(\frac{n_y}{n_z} - \frac{\partial z}{\partial y}\right)^2 dx dy \quad \text{(Eqn 3)}$$

There are several issues associated with recovering a range map using surface normals obtained from photometric reconstruction:
1) Accuracy of normal estimation is limited by how well the material reflectivity model represents the underlying surface.
2) Normal estimation will be subject to a level of noise depending on the quality of the camera sensor.
3) The normal map cannot represent (and hence recover) step edges, i.e. discontinuities in the surface. Similarly DC information (i.e. the overall gross distance of the surface from camera) cannot be directly obtained.

The end result is drift, i.e. curvature distortion in the reconstructed range map. Whilst applying more sophisticated material reflectivity models (such as including a specular term, as used by A. S. Georghiades *"Recovering 3-D shape and reflectance from a small number of photographs"* in Proceedings, Eurographics Workshop on Rendering, pages 230-240, 2003) can go some way to resolve this, issues (2) and (3) remain. The solution is to apply additional knowledge of the shape of the object surface from an alternative acquisition means, such as the data set from the passive stereoscopic reconstruction process. This data provides a low-resolution 'skeleton' providing the gross-scale shape, with the photometric data used to provide high-frequency geometric detail and material reflectance characteristics.

The approach of fusing photometric and stereoscopic data offers numerous benefits; in particular the error and bias modalities are complementary. Photometric recovery offers very high detail geometry, but is subject to low frequency noise (i.e. bias) in recovery. Geometric methods are typically lower resolution but have high frequency noise with zero bias. The combination of both approaches is therefore powerful as it offers a high resolution, metric recovery with less imaging hardware and faster processing times. The photometric-stereoscopic fusion task is to combine data from the two modalities to produce a single model. Several approaches will be known to those skilled in the art, however one particular apposite method is to use a Wiener filter.

A Wiener filter is the steady-state solution for the optimal state estimation problem as solved using a Kalman filter. A Wiener filter is of particular value when there are measurements of a derivative of a signal, such as in the case of the combination of photometric and stereoscopic data. The Wiener filter is the result of finding the minimum variance estimate of the steady state reconstructed height. The Wiener filter is obtained by finding the Fourier transforms of the measurement signals and assuming that these signals were generated by white noise processes and are corrupted by measurement noise of known frequency spectrum, as explained by S. Smith *"Digital Signal Processing: A Practical Guide for Engineers and Scientists"*, Butterworth-Heinemann 2002. In this embodiment we assume that, by way of example, the noise processes are themselves white.

If the estimated value of the object's surface position is denoted as $\bar{z}$ then the Wiener filter minimises $$E\left[\int \int (\bar{z} - z)^2 dx dy\right] \quad \text{(Eqn 4)}$$

where E[ ] denotes the expected value.

An alternative is to approach the integration in a deterministic manner in which a measurement 'd' is obtained from the three measurements in equation 3 by using the equation $$d = \int \int |\bar{z}_x - \hat{z}_x|^2 + |\bar{z}_y - \hat{z}_y|^2 + \lambda|\bar{z} - \hat{z}|^2 dx dy \quad \text{(Eqn 5)}$$

Here $\lambda$ specifies an overall relative weighting on the data acquired from passive stereoscopic reconstruction. Increasing value restricts the output to be closer to the stereoscopic data. In practice this may be achieved very quickly in the frequency domain by use of standard techniques such as the Fast Fourier Transform. Note that the use of the FFT here is to achieve speed rather than solving a least-squares problem, as in the Wiener filter. Other techniques may also be employed, for example using the Fast Wavelet Transform.

The output from this stage given the aforementioned geometrical representation of the objects surface as a 'range map' is a fused range map providing a 2D matrix of distances to the surface of the object relative to an arbitrary coordinate frame defined by one or more localisation templates, this range map having improved error characteristics over and above either the photometric or stereoscopic data, alongside a corresponding 2D matrix of material reflectivity coefficients indicating, for example, colour reflectivity.

A final optional function of the system is to provide an automated method in which data sets from multiple viewpoints may be automatically combined (or 'stitched') into a single coherent data set, to perform 3D imaging of an extended surface of an object. Fusion of geometric data sets may be achieved quite readily if the relative pose between viewpoints can be computed. Fusion of material, i.e. colour reflectance data requires production of illumination invariant material reflectivity maps. Both these tasks are greatly facilitated through the use of multiple localisation templates, as presently disclosed.

FIG. 7 shows an exemplary scanning configuration to achieve this, based on the hardware configuration shown in FIG. 1 and using overlapping viewpoints 708, 709, 710. Carrying out the imaging and processing steps above produces three data sets 711, 712, 713, each representing a sub-section of the surface of the object 701. Each viewpoint shares at least one template in common with another, allowing the change in camera pose relative to the commonly viewed template to be determined. A set of transformations mapping any one camera view to the others can thus be determined with respect to an arbitrarily chosen coordinate frame. With a global coordinate frame the sections of the geometry may be registered with respect to each other and then standard algorithms used to fuse the data set, as described for example by J. C. Carr and R. K. Beatson and J. B. Cherrie and T. J. Mitchell and W. R. Fright and B. C. McCallum and T. R. Evans *"Reconstruction and Representation of 3D Objects with Radial Basis Functions"* in Proceedings of ACM SIGGRAPH pages 67-76, 2001.

The key to stitching material reflectance data sets acquired from multiple viewpoints is to ensure overall illumination and colour constancy. As the position of the system varies between viewpoints, the overall distance of the light sources will not be constant which, if a template system is not used, can lead to variation in, for example, global illumination in material properties. This has led to the development of sophisticated algorithms to sample material properties from different viewpoints and compute transformations to achieve uniform illumination and colour constancy (such as those described in an example being U.S. Pat. No. 6,686,921, for example). The use of a set of calibrated templates, to provide a reflectance standard for photometric images, renders such techniques unnecessary. This is because all reconstruction is carried out with respect to calibrated templates, so variation in incident lighting intensity, camera colour balance etc. can be estimated and corrected for against a known standard. The material characteristics acquired are inherently illumination and colour constant. Stitching together a number of material reflectance data sets therefore simply requires use of the established global coordinate frame alongside e.g. colour interpolation algorithms well known to those skilled in the art.

Figure 8:
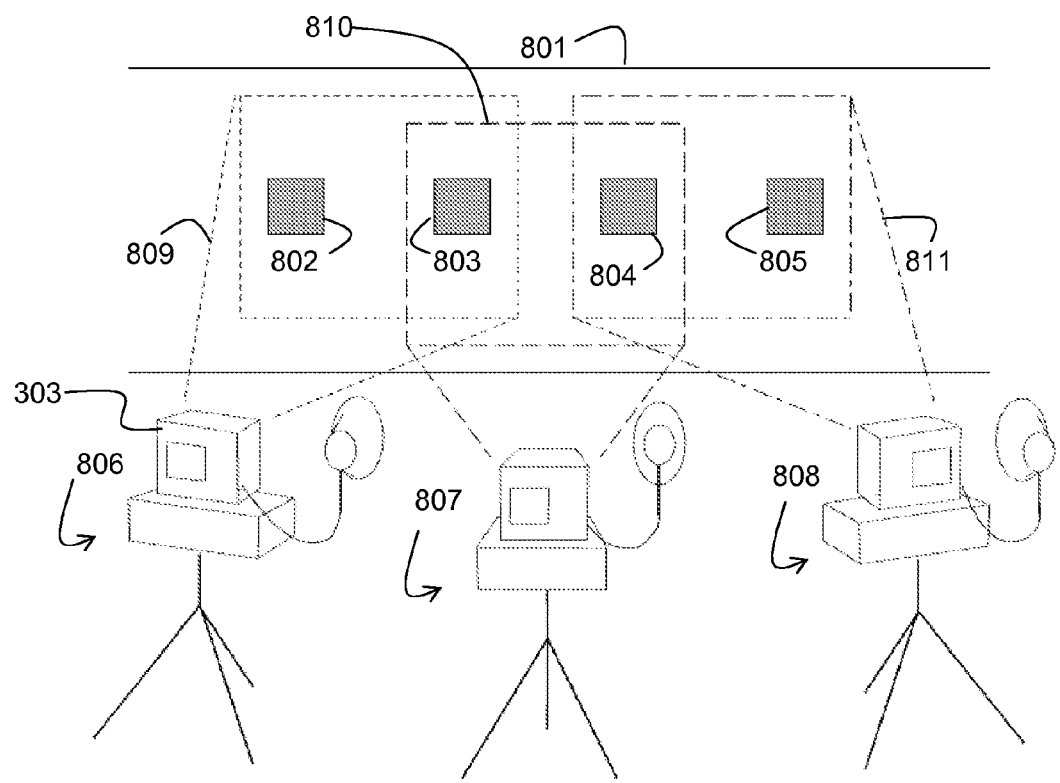
FIG. 8 shows the apparatus of FIG. 3 in use capturing an extensive surface area by imaging in multiple overlapping regions.

It will be appreciated that the use of multiple localisation targets to achieve 3D imaging of extensive surfaces is not restricted to the use of stereo cameras as shown in FIG. 7. FIG. 8 illustrates the system of FIG. 3 in use capturing an extensive surface area, again in this example a wall 801. Four localisation templates 802-805 (similar to the localisation template 401 shown in FIG. 4) are affixed to the wall, and the wall viewed by positioning the imaging device 303 and associated hardware 311 in three positions 806, 807, 808). Overlapping fields of view 809, 810, 811 each contain at least two out of four templates. Camera calibration remains constant, and as the relative pose between each template in each view can be computed (i.e. mapping 802 to 803, 803 to 804 and 804 to 805), a complete mapping determining the relative pose of all templates along with relative pose for positions 806, 807, 808 can be determined in a similar manner to the arrangement of FIG. 7.

Depending on the complexity of the surface under inspection and desired accuracy of reconstruction it may be desirable to acquire additional geometric information using a traditional geometric capture method. In FIG. 8 such a device (not shown) may be coupled to the main imaging device 303. Various approaches could be used, for example laser striping or speckling (as described in WO 2007/129047), white light or fringe based projection. Note that these systems do not provide a method for acquiring material reflectance properties per se and, as with the passive stereoscopic approach, are likely to produce lower resolution geometrical data that the photometric approach.

By capturing multiple localization templates using overlapping fields of view (as illustrated in FIG. 8) a complete set of relative pose transformations for all templates can be computed. Knowledge of pose of the localization templates itself offers a further method of providing approximate overall geometry for the surface under inspection. Given that the underlying surface is smoothly curving at the gross scale of the localization templates, then the templates (appropriately placed) can be considered as approximating the local surface tangent. Each template thus provides a single absolute location (vertex) in space on the surface under inspection and a measure of the instantaneous local surface normal at this point, found as the normal to the plane of the template. A global coordinate frame can be arbitrarily chosen and a 3D surface fit to the vertex and normal data. Thus, for a suitably smoothly varying surface, a coarse model of the underlying 3D structure may be derived without use of additional geometric scanning hardware.

Figure 9:
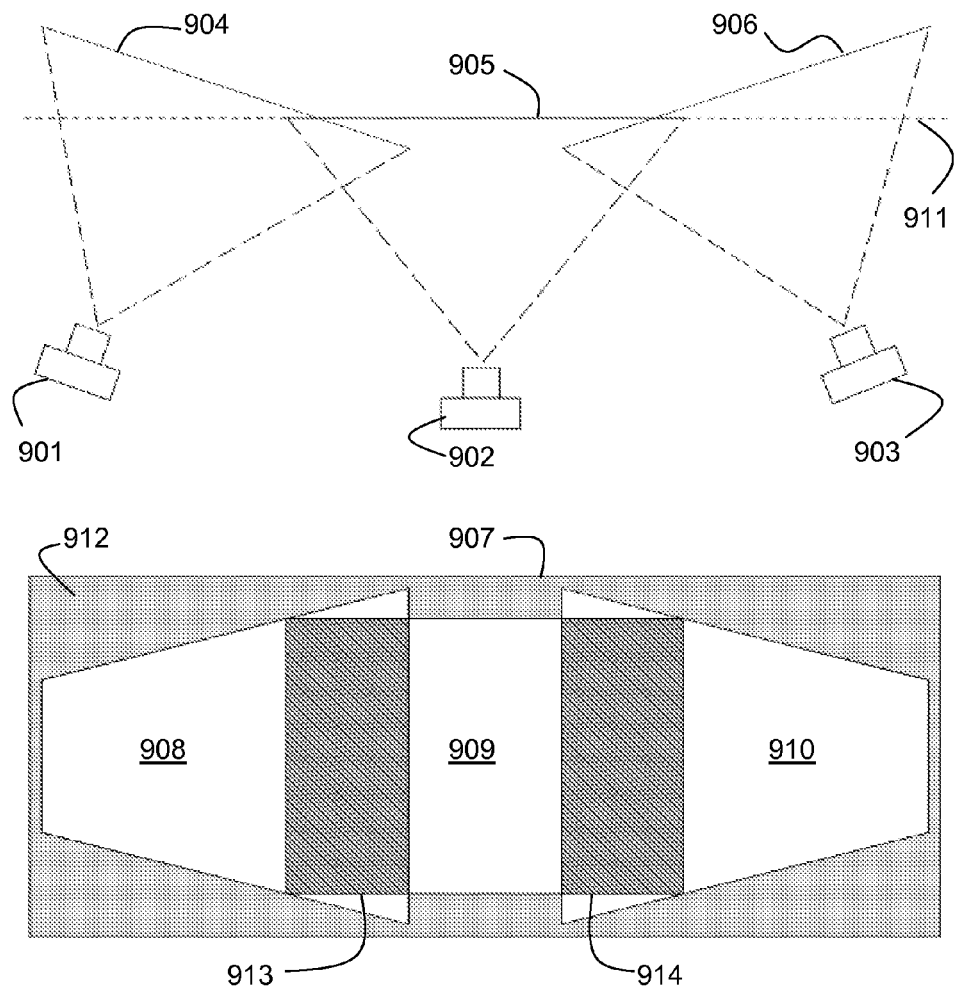
FIG. 9 illustrates an exemplary system for combining images obtained from different viewpoints.

FIG. 9 illustrates one exemplary method which can be used in the merging of reconstructed photometric and geometric data. FIG. 9 is a schematic representation of a 'birds eye' view of three camera viewpoints 901, 902 903, each viewpoint having a corresponding image plane 904, 905, 906. The images themselves may consist of, for example, photometric normal data or geometric range data. It is desired to transform the "outer" views 904, 906 to the viewpoint of the middle view 905, as shown by the extended dotted line 911. This can be achieved via planar projection, as will be known to those skilled in the art. The result is a reconstructed viewpoint 907—the trapezoidal areas 908 and 910 result from the planar projection of the outer viewpoints 904, 506, with the rectangular area 909 being the original image 905. No data is available for the area 912 outside the three areas 908-910: the image 907 extends beyond the viewpoints captured by the cameras. The overlapping regions 913, 914 indicate where the re-projection has resulted in multiple data samples being available at the same location. Filtering operations must be applied in these areas, with the appropriate operation depending on the nature of the data. The reader will appreciate that other re-projection methods could be applied, for example mapping to a (partial) cylinder or sphere, depending on the underlying gross geometry of the surface region under inspection.

It will be appreciated that variations from the above described embodiments may still fall within the scope of the invention. For example, the localisation template in FIG. 4 illustrates a particular set of geometric features, but it will be appreciated that any suitable features usable to establish a metrology may be used. Similarly, the exemplary imaging devices have been described as comprising "cameras" but any suitable image sensors may be used. Indeed, a single sensor with a lens splitter may also be suitable. Other possible examples include video cameras, CMOS sensors etc. Furthermore the illuminating radiation need not be visible light; any suitable form of energy may be used, and the image sensors will be chosen accordingly. The cameras have been described in various embodiments as being "rigidly" affixed to the casing but it will be appreciated that this includes situations such as cameras telescopically mounted to the casing.

The invention claimed is:

1. Apparatus for computing a three dimensional model of an object, comprising:
   a portable, hand-held instrument comprising multiple directional energy sources arranged to directionally illuminate the object and an imaging sensing assembly having at least two spatially separated viewpoints obtained by respective cameras at known fixed positions relative to each other, the imaging sensing assembly arranged to record a series of images of the object at each viewpoint when the object is illuminated by each of the sources;
   at least one localization template having predetermined geometrical features, the localization template arranged in use to be visible to at least one of the viewpoints simultaneously with the object; and
   a processor arranged to analyze the images recorded at the viewpoints, so as to:
      determine a location and pose of each viewpoint relative to the template for each image in the series of images;
      generate photometric data for the object using the calculated location and pose of the viewpoints and the direction of illumination from each energy source;
      generate geometric data comprising a skeleton three dimensional model of the object by performing stereoscopic reconstruction using optical triangulation so as to provide the gross-scale shape of the object, wherein the optical triangulation is performed based on the known fixed positions of the cameras relative to each other; and
      combine the geometric data and photometric data by using the photometric data to provide high-frequency geometric detail onto the gross-scale shape so as to construct the three dimensional model.

2. Apparatus as claimed in claim 1, wherein the multiple energy sources are at fixed positions relative to the viewpoints so that the direction of illumination from each of the sources relative to the viewpoints is known.

3. An apparatus as claimed in claim 1, wherein the localization template is arranged in use to be illuminated by the directional energy sources when it is visible to at least one of the viewpoints simultaneously with the object, and wherein the processor is arranged to calculate the direction of illumination from a part of the each image incorporating the localization template.

4. An apparatus as claimed in claim 3, wherein the directional energy sources are movable relative to the viewpoints between images in the series of images.

5. Apparatus as claimed in claim 3, wherein the template includes a three dimensional source localization feature, and wherein the processor is arranged to determine a pose of each directional energy source relative to the localization template from a part of the images incorporating the source localization feature.

6. Apparatus as claimed in claim 5, wherein the source localization feature comprises a pyramid or cone of known dimensions.

7. Apparatus as claimed in claim 1, comprising a plurality of localization templates, the apparatus arranged so that:
   the viewpoints and source are locatable in a first location in which at least two first templates are visible to at least one of the viewpoints simultaneously with a first portion of the object; and
   the viewpoints and source are movable to a second location in which at least one of the at least two first templates is still visible to at least one viewpoint simultaneously with at least one other template and a second portion of the object overlapping with the first portion;
   wherein the viewpoints are arranged to record images from the first and second locations, and wherein the processor is arranged to combine data from the images so as to generate a model covering the first and second portions of the object.

8. Apparatus as claimed in claim 7, wherein each template includes a three dimensional source localization feature, and wherein the processor is arranged to determine a pose of each directional energy source relative to each template from parts of the images incorporating the source localization feature.

9. Apparatus as claimed in claim 7, wherein each template includes a unique identification feature enabling that template to be distinguished from other templates.

10. Apparatus as claimed in claim 9, wherein the unique identification feature comprises a bar code decodable by the processor.

11. Apparatus as claimed in claim 9, wherein the unique identification feature includes a RFID tag.

12. Apparatus as claimed in claim 9, wherein the unique identification feature includes an EEPROM chip.

13. An apparatus as claimed in claim 1, where an optical sensor is located at each viewpoint.

14. Apparatus as claimed in claim 1, wherein the apparatus includes optical filtering for reducing visibility of direct reflections of the source in the images.

15. Apparatus as claimed in claim 1, wherein the object comprises at least part of a three-dimensional article.

16. Apparatus as claimed in claim 1, wherein the object comprises a surface or part of a surface.

17. A method for computing a three dimensional model of an object, comprising:
   directionally illuminating the object with multiple directional energy sources housed in a portable, hand-held instrument;
   recording a series of images of the object illuminated by each of the sources at each of at least two spatially separated viewpoints obtained by respective cameras at known fixed positions relative to each other, and housed in the instrument, the images from at least one of the viewpoints also including at least one localization template having predetermined geometric features;

from the images recorded, determining a location and pose of each viewpoint relative to the localization template;

from the images recorded, generating photometric data for the object using the calculated location and pose of the viewpoints and direction of illumination from each directional energy source;

generating geometric data comprising a skeleton three dimensional model of the object by performing stereoscopic reconstruction using optical triangulation so as to provide the gross-scale shape of the object, wherein the optical triangulation is performed based on the known fixed positions of the cameras relative to each other; and combining the geometric data and photometric data by using the photometric data to provide high-frequency geometric detail onto the gross-scale shape so as to construct the three dimensional model.

18. A method as claimed in claim 17, wherein the template includes a three dimensional source localization feature, the method further comprising determining the pose of the sources relative to the template from the parts of the images incorporating the source localization feature.

19. A method as claimed in claim 17, further comprising:
locating the viewpoints and directional energy sources in a first location in which at least two first templates are visible to at least one of the viewpoints simultaneously with a first portion of the object;
recording a first image at each viewpoint from the first location, each first image including the first portion of the object and the at least two first templates;
moving the viewpoints and source to a second location in which at least one of the at least two first templates is still visible to at least one of the viewpoints simultaneously with at least one other template and a second portion of the object overlapping with the first portion;
recording a second image at each viewpoint from the second location; and
combining data from the first and second images so as to generate a model covering the first and second portions of the object.

20. A method as claimed in claim 19, wherein each template includes a three dimensional source localization feature, the method further comprising determining the pose of the source relative to each template from the parts of the images incorporating the source localization feature.

21. A method as claimed in claim 19, wherein each template includes a unique identification feature enabling that template to be distinguished from other templates.

22. A method as claimed in claim 21, wherein the unique identification code comprises a bar code, the method further comprising identifying the bar code in the image and decoding the bar code to identify the template.

23. A method as claimed in claim 21, wherein the unique identification feature includes a RFID tag, the method further comprising using a RF reader to identify the template.

24. A method as claimed in claim 21, wherein the unique identification feature includes an EEPROM chip, the method comprising using a reader to identify the template.

25. A method as claimed in claim 17, wherein the object comprises at least part of a three-dimensional article.

26. A method as claimed in claim 17, wherein the object comprises a surface or part of a surface.

27. A method for constructing a three dimensional model of an object, comprising:
using at least one image sensor to record images of overlapping portions of the object from multiple known viewing directions, each image including at least two localization templates having predetermined geometrical features;
determining the relative position of the sensor with respect to the templates;
combining images from the multiple known viewing directions of the surface for further processing based on the known viewing directions; and
performing surface reconstruction of a surface of the object.

28. A method as claimed in claim 27, further comprising:
illuminating the object with a geometric directional energy source;
using the sensor to capture an image of the object illuminated by the geometric directional energy source;
performing image processing functions to perform geometric reconstruction; and
combining geometric and reflectance variation data to output a three dimensional reconstruction of the surface.

* * * * *